(12) United States Patent
Yoshida

(10) Patent No.: US 8,264,728 B2
(45) Date of Patent: Sep. 11, 2012

(54) LOG COLLECTING SYSTEM, COMPUTER APPARATUS AND LOG COLLECTING PROGRAM

(75) Inventor: Akidi Yoshida, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 985 days.

(21) Appl. No.: 12/202,817

(22) Filed: Sep. 2, 2008

(65) Prior Publication Data
US 2009/0063900 A1 Mar. 5, 2009

(30) Foreign Application Priority Data

Aug. 30, 2007 (JP) .................................. 2007-224933

(51) Int. Cl.
*G06K 15/00* (2006.01)
(52) U.S. Cl. ............ 358/1.16; 358/1.1; 358/437; 347/2; 399/10
(58) Field of Classification Search .................. 358/1.16, 358/1.1, 1.14, 1.15, 404, 406, 437, 444, 468; 347/2, 5, 23; 399/10, 11, 18, 20; 710/15, 710/18, 19, 25, 62, 72; 713/340
See application file for complete search history.

(56) References Cited

U.S. PATENT DOCUMENTS

| | | | | |
|---|---|---|---|---|
| 6,864,992 | B1 * | 3/2005 | Okada | 358/1.15 |
| 7,787,143 | B2 * | 8/2010 | Fukuda | 358/1.16 |
| 8,027,051 | B2 * | 9/2011 | Hozumi | 358/1.15 |
| 8,040,544 | B2 * | 10/2011 | Murakami et al. | 358/1.13 |
| 2004/0215708 | A1 * | 10/2004 | Higashi et al. | 709/201 |
| 2007/0121151 | A1 * | 5/2007 | Uchida | 358/1.15 |
| 2007/0188810 | A1 * | 8/2007 | Nakagama et al. | 358/2.1 |
| 2007/0198861 | A1 * | 8/2007 | Minami et al. | 713/194 |
| 2007/0250453 | A1 * | 10/2007 | Sako et al. | 705/67 |

FOREIGN PATENT DOCUMENTS

| | | |
|---|---|---|
| JP | 8-249215 | 9/1996 |
| JP | 2000-3299 | 1/2000 |

(Continued)

OTHER PUBLICATIONS

English Machine Translation of JP 2005-056018-A (Ogawa, published Mar. 3, 2005).*

(Continued)

*Primary Examiner* — Benny Q Tieu
*Assistant Examiner* — Juan Guillermety
(74) *Attorney, Agent, or Firm* — Scully, Scott, Murphy & Presser, PC

(57) ABSTRACT

A log collecting system includes a computer apparatus and at least one peripheral apparatus connected to the computer apparatus. The peripheral apparatus stores a first log relating to all operation of the at least one peripheral apparatus in a first log memory region, and stores, in a second log memory region, a second log indicative of any influence on the operation of the at least one peripheral apparatus among the first logs. The computer apparatus stores a third log relating to the operation of the computer apparatus concerning the at least one peripheral apparatus, acquires and stores the second logs, acquires the first log stored in the first log memory region, and creates one log information with the acquired first log, the third log stored in the third log memory region, and the second log stored in the fourth log memory region when the first log acquiring section acquires the first log.

14 Claims, 11 Drawing Sheets

FOREIGN PATENT DOCUMENTS

| | | |
|---|---|---|
| JP | 2000-148430 | 5/2000 |
| JP | 2001-290396 | 10/2001 |
| JP | 2002-297467 | 10/2002 |
| JP | 2003-15855 | 1/2003 |
| JP | 2005-56018 | 3/2005 |

OTHER PUBLICATIONS

English Machine Translation of JP 2003-015855-A (Iwata, published Jan. 17, 2003).*
English Machine Translation of JP 2000-148430-A (Tokimune, published May 30, 2000).*

* cited by examiner

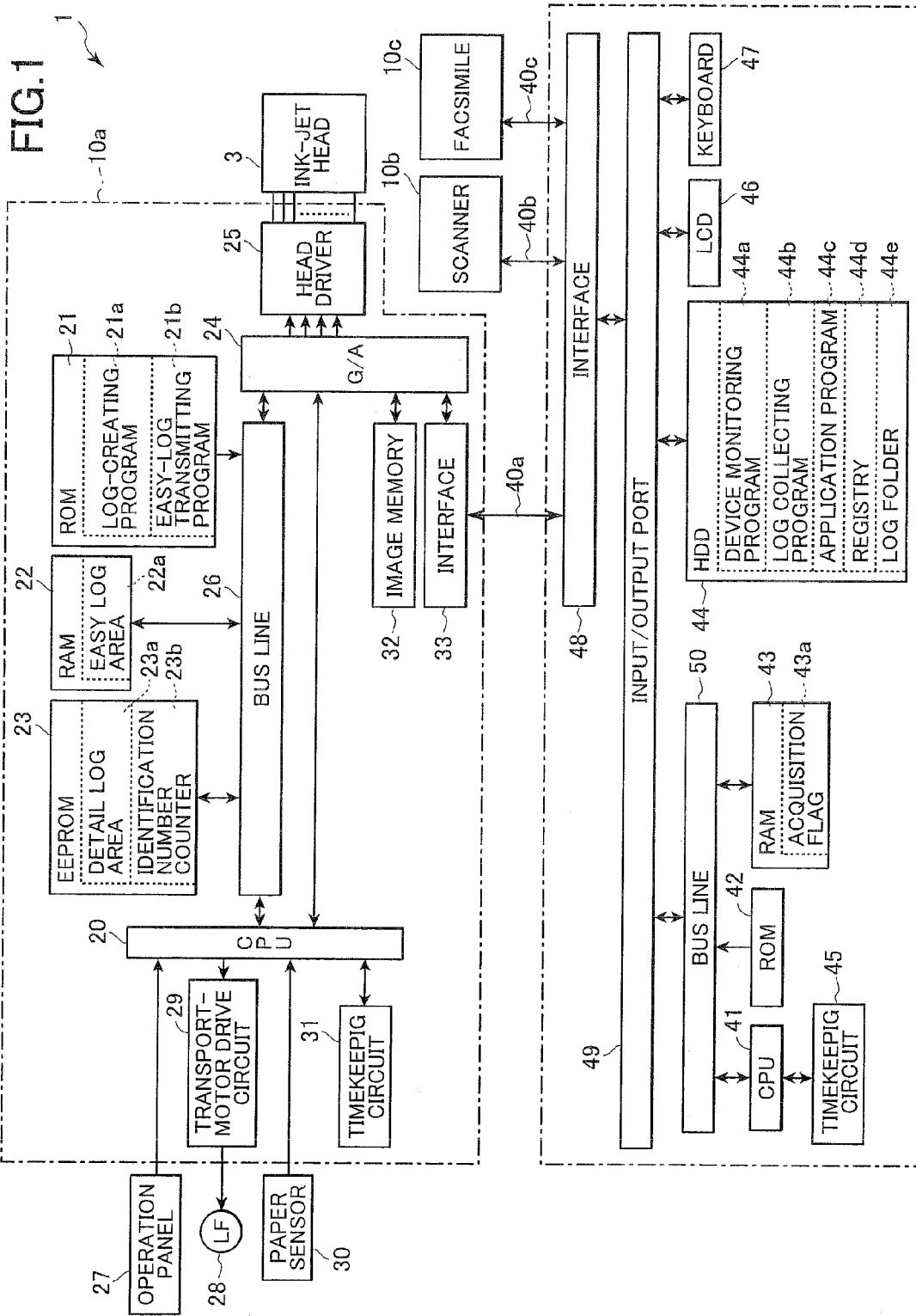

DETAIL LOG OF THE PRINTER                                   61

```
20070801111112, 0000001, INF, Set Parameter
20070801111112, 0000002, INF, Start Working
20070801111113, 0000003, INF, Working Step1
20070801111114, 0000004, INF, Working Step2
20070801111115, 0000005, INF, Working Step3
20070801111116, 0000006, INF, Working Step4
20070801111117, 0000007, WRN, Device Connection not found.
20070801111117, 0000008, ERR, Working Failed! Device parameter cannot read.
```

EASY LOG OF THE PRINTER                                     62

```
20070801111117, 0000007, WRN, Device Connection not found.
20070801111117, 0000008, ERR, Working Failed! Device parameter cannot read.
```

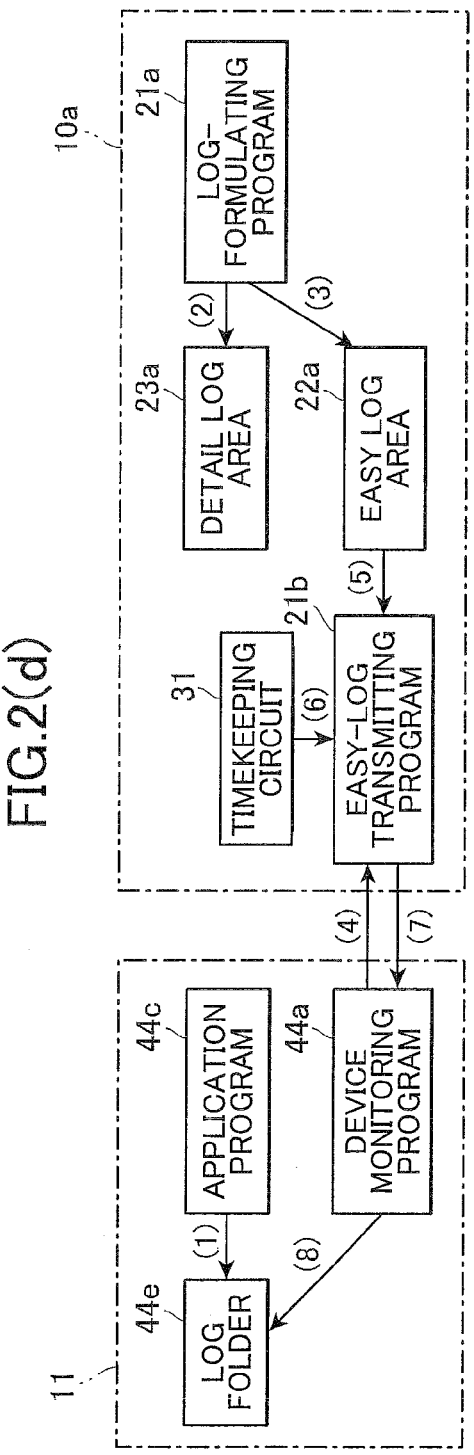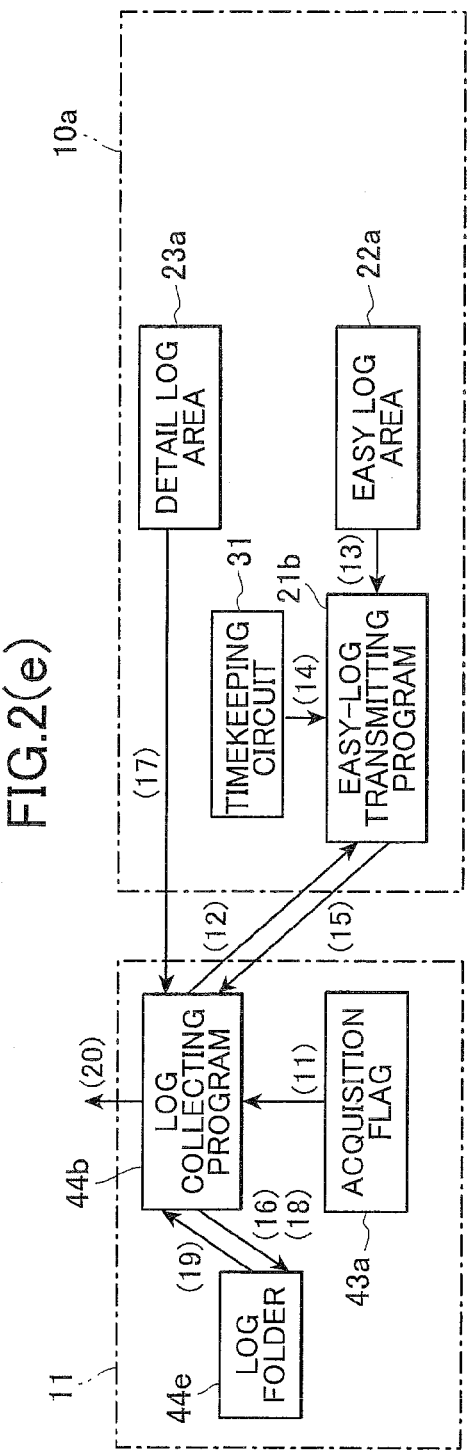

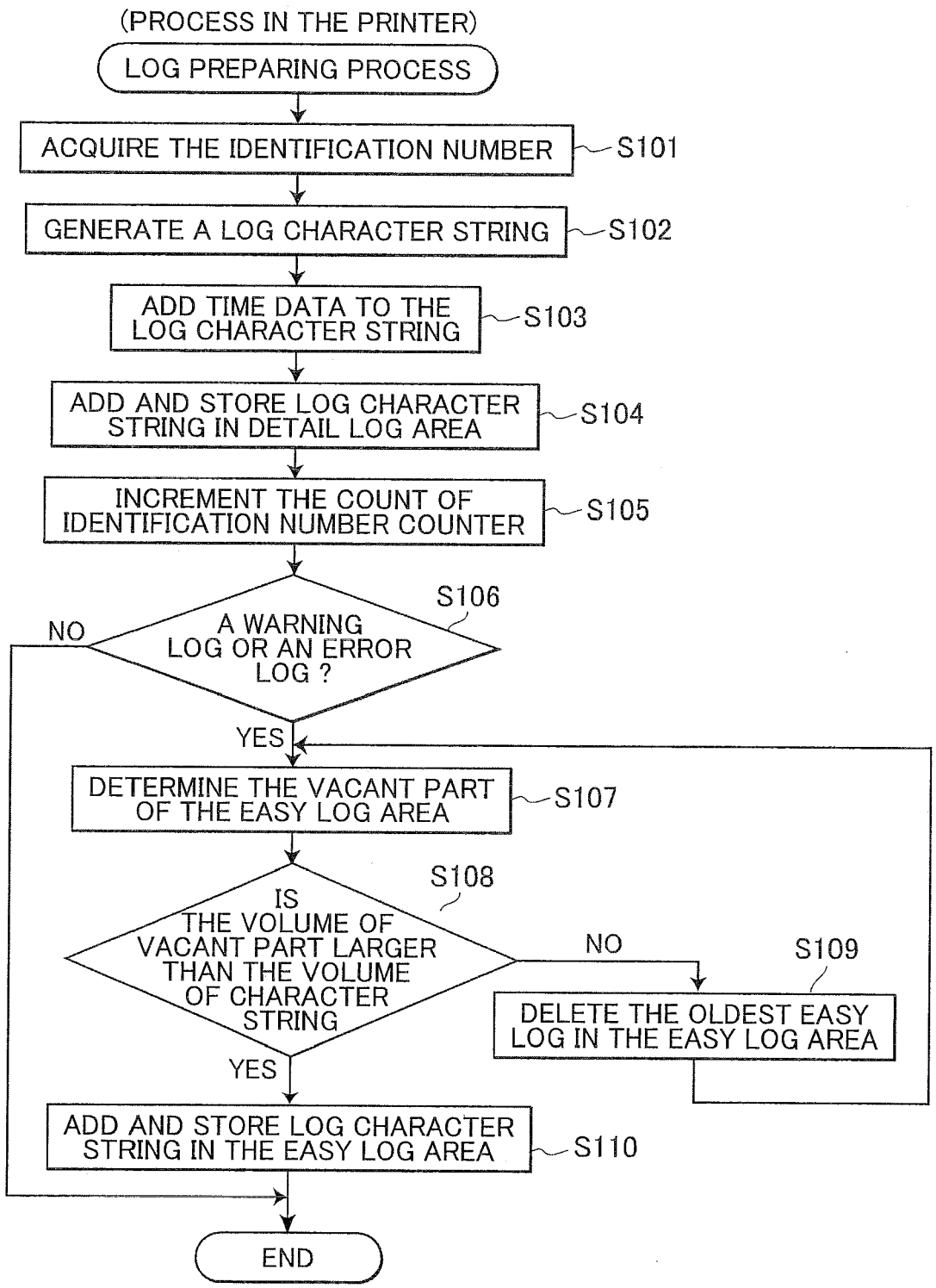

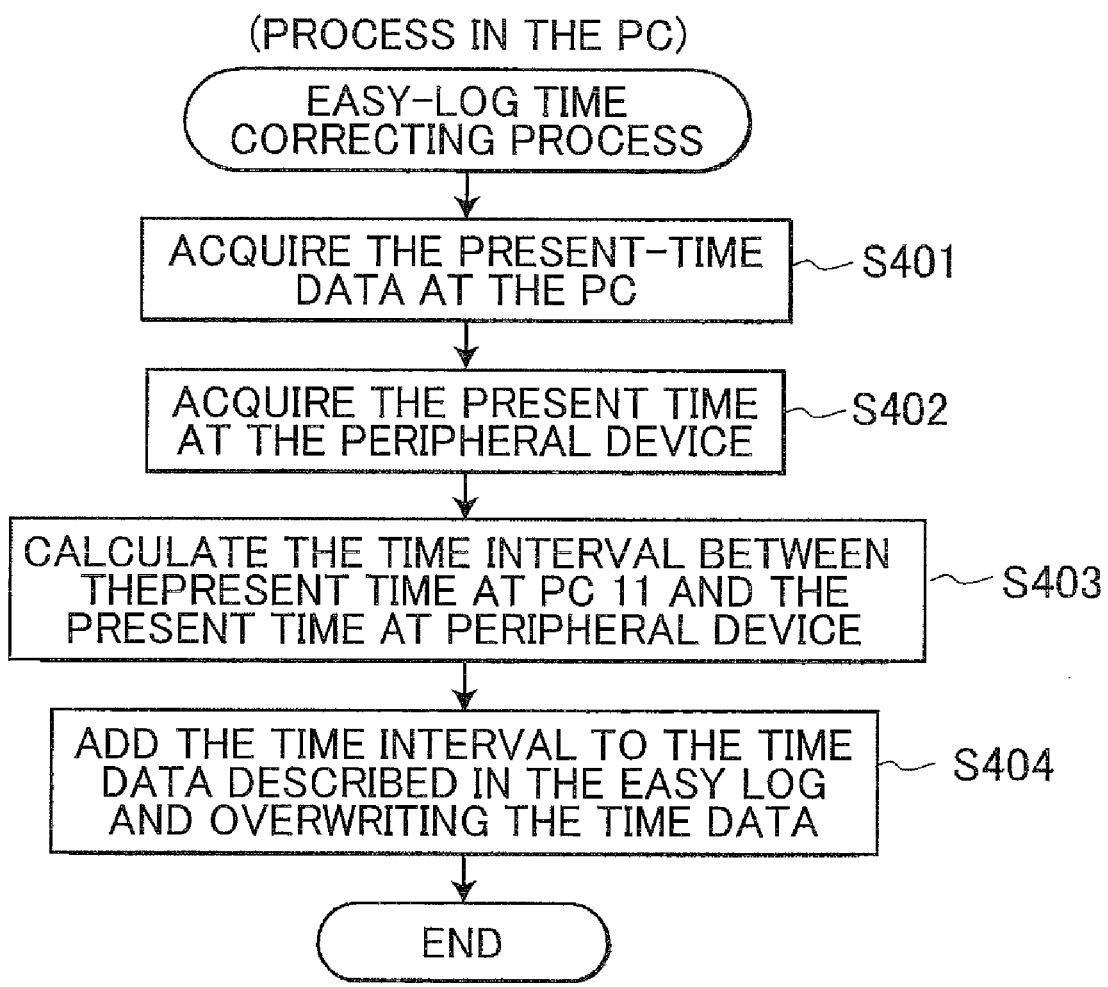

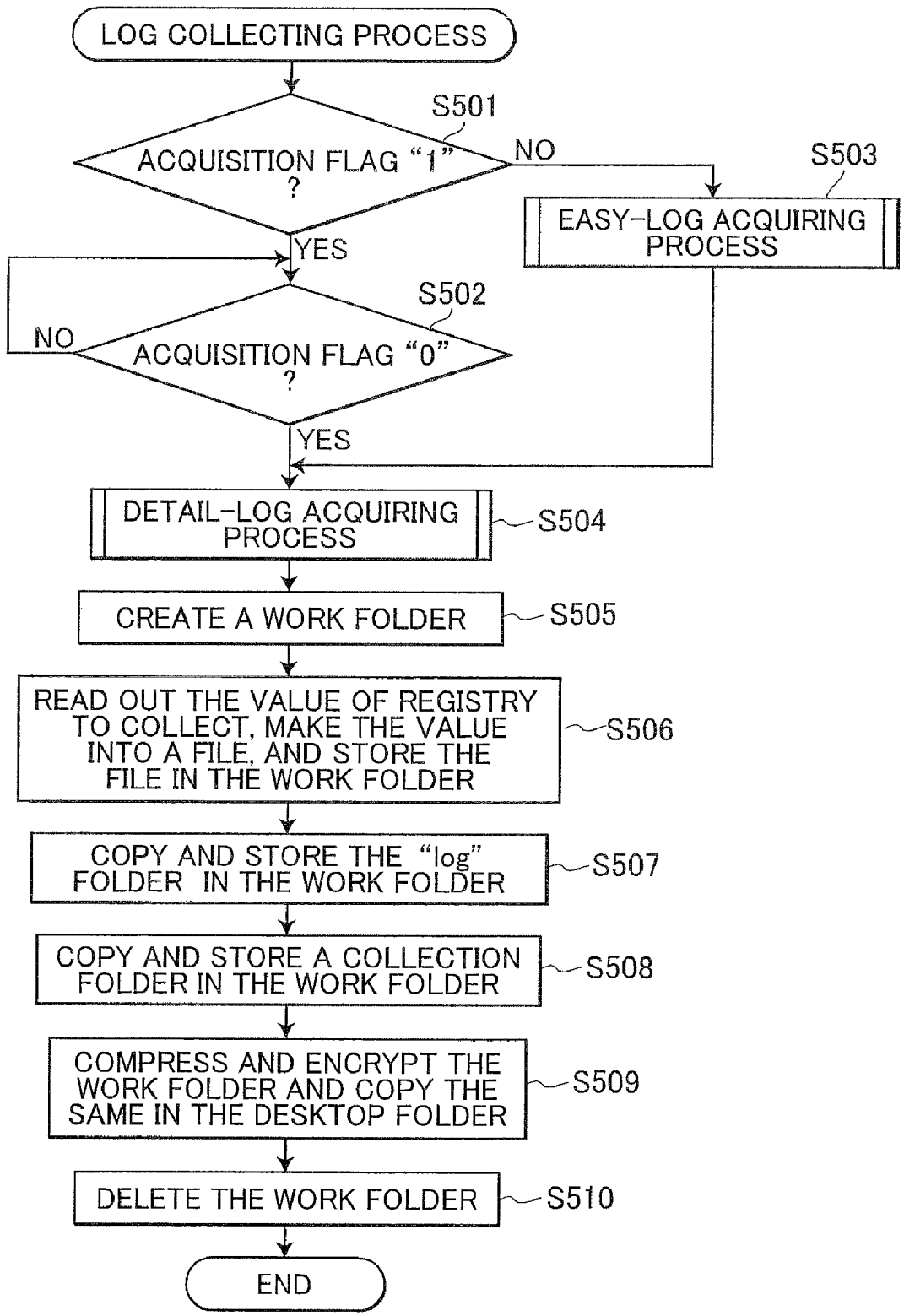

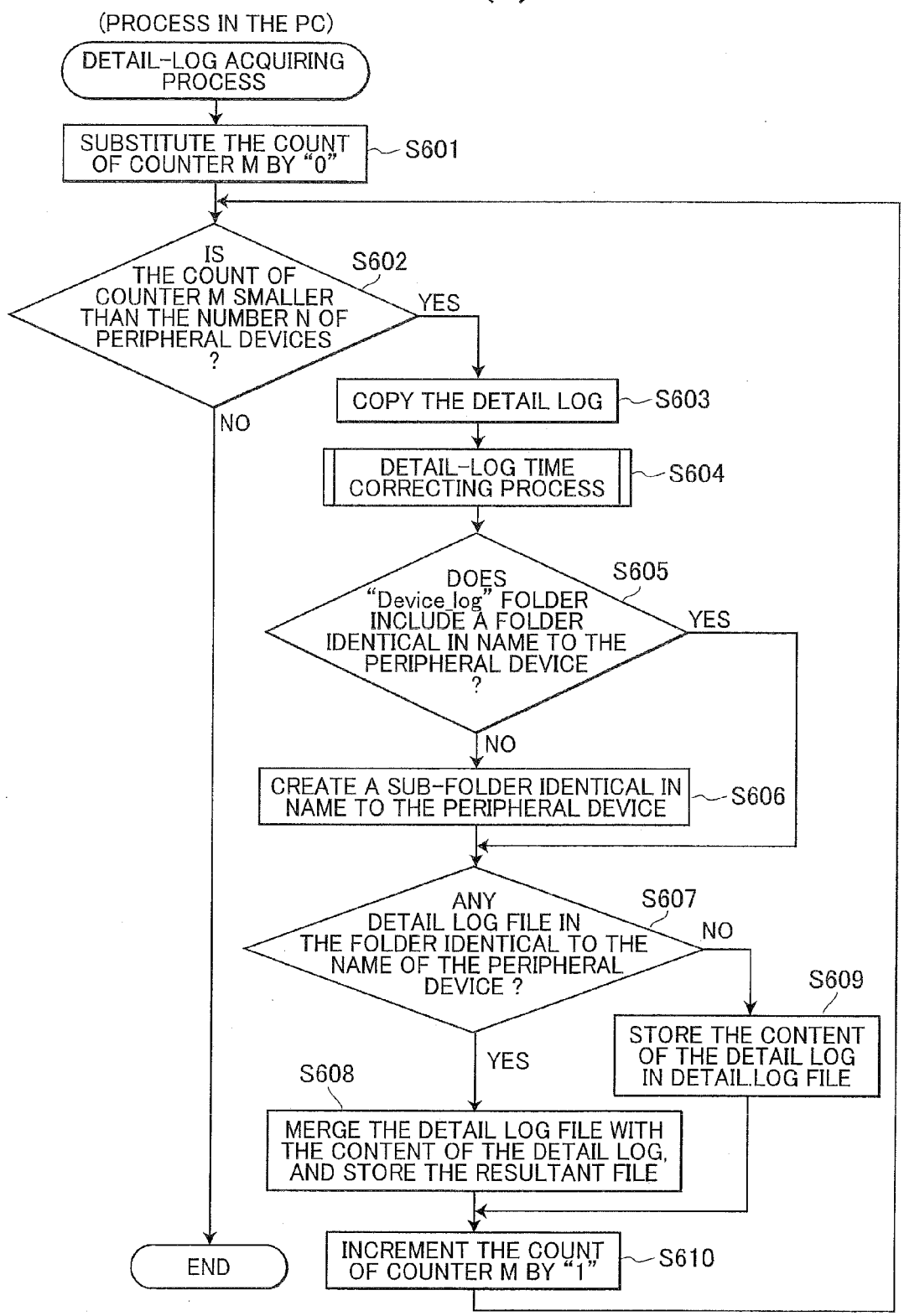

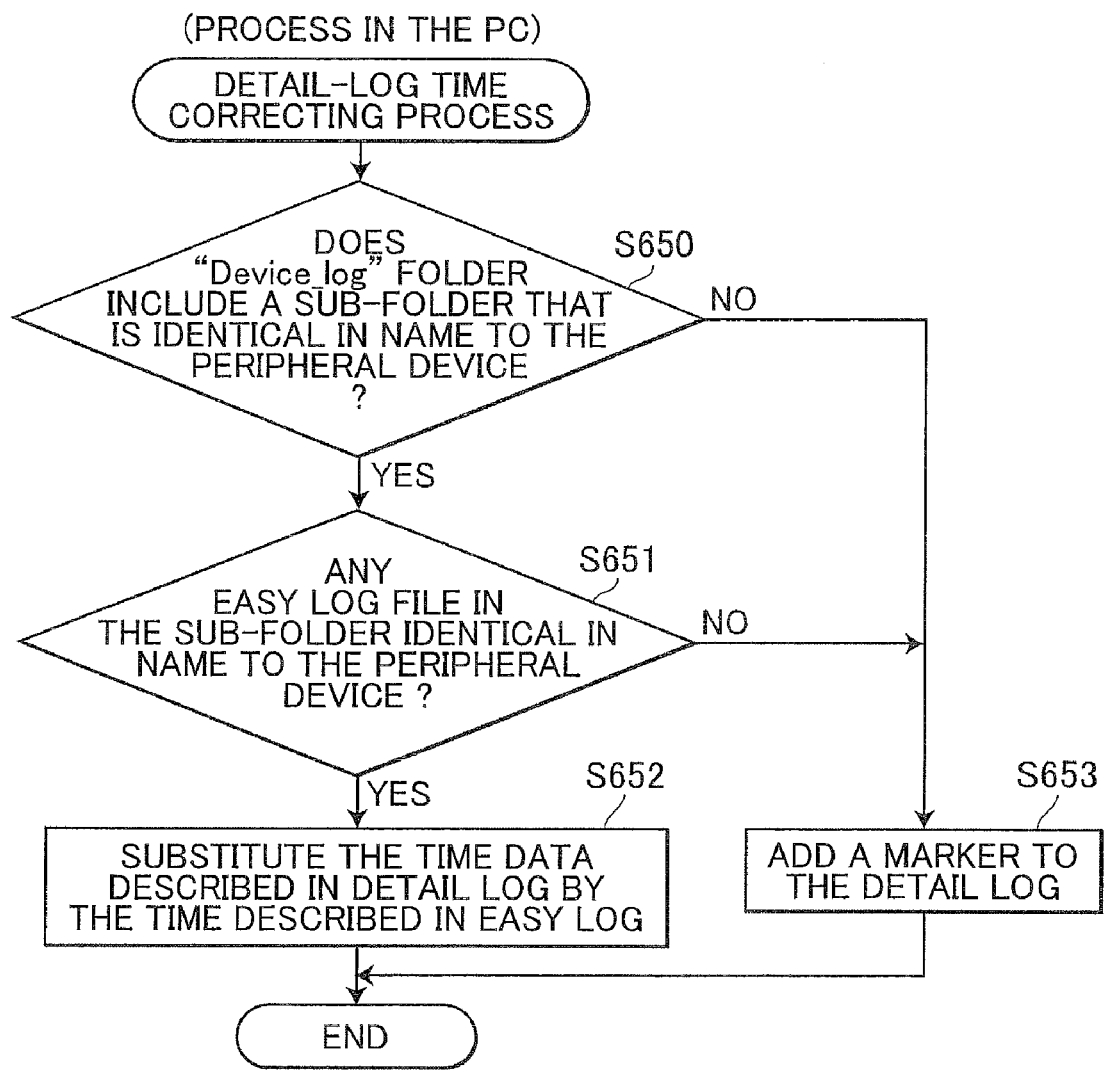

LOG COLLECTING SYSTEM, COMPUTER APPARATUS AND LOG COLLECTING PROGRAM

CROSS REFERENCE TO RELATED APPLICATION

This application claims priority from Japanese Patent Application No. 2007-224933 filed Aug. 30, 2007. The entire content of this priority application is incorporated herein by reference.

TECHNICAL FIELD

The present invention relates to a log collecting system and a computer apparatus.

BACKGROUND

In most cases, peripheral devices such as a printer, a scanner and a facsimile apparatus are connected to a personal computer (PC). While controlling the peripheral devices, the PC performs various processes. If any peripheral devices connected to the PC malfunction, the PC can no longer control these peripheral devices. In this case, the PC may not perform any process as desired by the user. The cause of the trouble in the peripheral devices cannot be identified in most cases, if the state in which the PC or the peripheral devices had been operating before the peripheral devices started malfunctioning is only checked.

In recent years, a log collecting system has been developed, which generates log items, i.e., record items about the operations a PC has performed, giving and receiving commands and data to and from a peripheral devices. The log collecting system stores the log items. If a trouble develops in the PC, the log collecting system sends the log items to the vendor provided in the peripheral devices. The vendor analyzes the log items to identify the cause of the trouble in the PC. However, the vendor cannot analyze the internal state the peripheral devices assume because only the log items the PC has generated are sent to the vendor. Therefore, the vendor can hardly identify the cause of the trouble.

Japanese unexamined patent application publication No. 2005-56018 describes a print-log management method, in which a PC receives the print information generated by a printer, every time the PC issues a print job to the printer, and merges the print information with a print log the PC has generated, thereby generating a print-management log item. The information about any printing the printer has performed can therefore be reliably managed.

SUMMARY

However, by using this print-log management method, the following problem can arise. That is, only the log items concerning a particular job called print job are collected. It the print-log management method is applied to the log collecting system described above, the peripheral devices cannot collect the information about anything other than the particular job. Therefore, all troubles that have taken place in the peripheral devices cannot be analyzed if the peripheral devices malfunction and cause a trouble in the process the PC performs. If the peripheral devices malfunction while executing a job other than the particular job, the cause of the trouble can hardly be identified, either.

The peripheral devices may generate log items concerning all jobs executed and may keep sending the log items to the PC at all times. If this is the case, the load of communication between the PC and the peripheral devices will inevitably increase.

In view of the above-identified problem, an object of the invention is to provide a log collecting system and a computer apparatus, which can collect log items, easily identifying the cause of a trouble in any process the computer apparatus performs, while suppressing the increase in the load of communication between the computer apparatus and the peripheral device.

In order to attain the above and other objects, the invention provides a log collecting system including a computer apparatus, and at least one peripheral apparatus connected to the computer apparatus, the computer apparatus collecting a log that records operation of the at least one peripheral apparatus. The peripheral apparatus includes a first log memory controlling section that stores a first log relating to all operation of the at least one peripheral apparatus in a first log memory region, and a second log memory controlling section that stores, in a second log memory region, a second log indicative of any influence on the operation of the at least one peripheral apparatus among the first logs. The computer apparatus includes a third log memory controlling section that stores, in a third log memory region, a third log relating to the operation of the computer apparatus concerning the at least one peripheral apparatus, a fourth log memory controlling section that continuously or discontinuously acquires the second logs stored in the second log memory region, and stores the second log in a fourth log memory region, a first log acquiring section that acquires, at a predetermined timing, the first log stored in the first log memory region, and a log information creating section that creates one log information with the acquired first log, the third log stored in the third log memory region, and the second log stored in the fourth log memory region when the first log acquiring section acquires the first log.

According to another aspect, the invention provides a computer apparatus connected to at least one of the peripheral apparatus and collecting the log of the operation of the peripheral apparatus including a first log memory region that stores a first log relating to a record of operation of the peripheral apparatus, and a second log memory region that stores, among the first log, a second log indicative of influence on the operation of the peripheral apparatus. The computer apparatus includes a third log memory controlling section, a fourth log memory controlling section, a first log acquiring section and a log information creating section. The a third log memory controlling section stores, in a third log memory region, a third log relating to the operation of the computer apparatus concerning the at least one peripheral apparatus. The fourth log memory controlling section continuously or discontinuously acquires the second logs stored in the second log memory region, and stores the second log in a fourth log memory region. The first log acquiring section acquires, at a predetermined timing, the first log stored in the first log memory region. The log information creating section creates one log information with the acquired first log, the third log stored in the third log memory region, and the second log stored in the fourth log memory region when the first log acquiring section acquires the first log.

According to another aspect, the invention provides a computer readable storage medium storing a set of image processing program instructions executable on a computer apparatus connected to at least one of the peripheral apparatus and Collecting the log of the operation of the peripheral apparatus including a first log memory region that stores a first log relating to a record of operation of the peripheral apparatus, and a second log memory region that stores, among the first log, a second log indicative of influence on the operation of the peripheral apparatus. The instructions include storing, in a third log memory region, a third log relating to the operation of the computer apparatus concerning the at least one peripheral apparatus, acquiring continuously or discontinuously the second logs stored in the second log memory region, and stores the second log in a fourth log memory region, acquiring, at a predetermined timing, the first log stored in the first log memory region, and creating one log information with the acquired first log, the third log stored in the third log memory region, and the second log stored in the fourth log memory region when the first log acquiring section acquires the first log.

BRIEF DESCRIPTION OF THE DRAWINGS

FIG. 1 is a schematic block diagram showing the electrical configuration of a log collecting system according to an embodiment of the present invention;

FIG. 2(*b*) is a schematic illustration of the contents of an easy log stored in the easy log area of the log collecting system;

FIG. 2(*c*) is a schematic diagram showing the configuration of the log folder of the log collecting system;

FIG. 2(*d*) is a sequence chart showing the sequence of operation the log collecting system performs in the normal operating mode;

FIG. 2(*e*) is a sequence chart showing the sequence of operation the log collecting system performs in the log-collecting mode;

FIG. 3 is a flowchart showing the log preparing process performed in a printer;

FIG. 7 is a flowchart showing the easy-log time correcting process performed in the PC;

FIG. 8 is a flowchart showing the log collecting process performed in the PC;

FIG. 9(*a*) is a flowchart showing the detail-log acquiring process performed in the PC; and FIG. 9(*b*) is a flowchart showing the detail-log time correcting process performed in the PC.

DETAILED DESCRIPTION

Figures 2A, 2B, 2C:
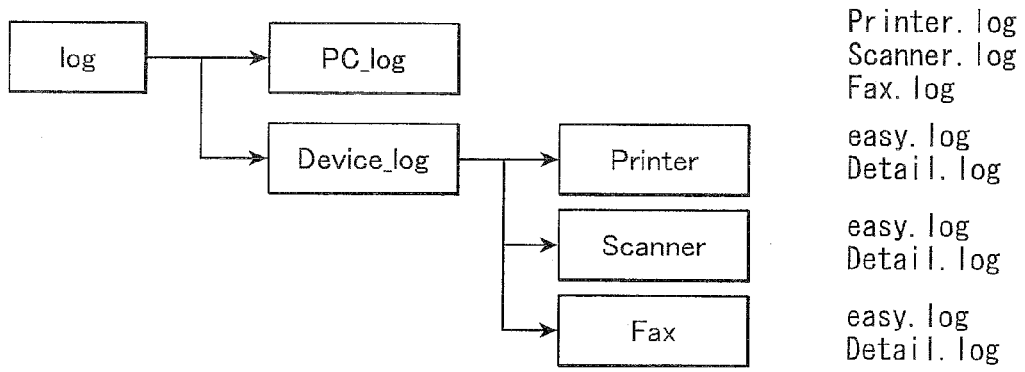
FIG. 2(*a*) is a schematic illustration of the contents of a detail log stored in the detail log area of the log collecting system.

Next, an embodiment of the present invention will be described while referring to the accompanying drawings. FIG. 1 is a schematic block diagram of a log collecting system according to the embodiment of the present invention, showing the electric configuration thereof.

As shown in FIG. 1, the log collecting system 1 has an ink-jet printer 10*a* (hereinafter called "printer 10*a*"), a scanner 10*b*, a facsimile 10*c*, and a personal computer 11 (hereinafter called "PC 11"). The printer 10*a*, scanner 10*b* and facsimile 10*c* are connected to the PC 11 by communications cables 40*a*, 40*b* and 40*c*, respectively. The log collecting system 1 is a system that can easily identify the cause of a trouble in any process the PC 11 performs, while suppressing the increase in the load of communication between the PC 11, one the one hand, and the printer 10*a*, scanner 10*b* and facsimile 10*c*, on the other hand.

The printer 10*a* is an ink-jet printer that has an ink-let head 3. In accordance with an instruction output from the PC 11, the printer 10*e* ejects ink droplets toward a recording medium through the nozzles made in the ink-jet head 3 for printing. The printer 10*a* includes a CPU (Central Processing Unit) 20, a ROM (Read Only Memory) 21, a RAM (Random Access Memory) 22, an EEPROM (Electrical Erasable and Programmable Read Only Memory) 23, a Gate Array (G/A) 24, and a Driver for Head 25. Each of the CPU 20, the ROM 21, the RAM 22, the EEPROM 23, and the Gate Array 24 are connected via a bus line 26. The Driver for Head 25 is connected to the Gate Array 24.

The CPU 20 is a processing unit that controls the printer 10*a* in accordance with a control program stored in the ROM 21. The CPU 20 generates, for example, an ink-injection timing signal and a reset signal. The ink-injection timing signal and the reset signal are transferred to the gate array 24, which will be described later.

An operation panel 27, a transport-motor drive circuit 29, a paper sensor 30 are connected to the CPU 20. A user may operate the operation panel 27 to input instructions. The transport-motor drive circuit 29 can drive a transport motor (LF motor) 28. When driven, the transport motor 28 feeds a recording medium. The paper sensor 30 can detect the leading edge of a recording medium. The CPU 20 controls the operation panel 27, drive circuit 29 and paper sensor 30.

A timekeeping circuit 31 is also connected to the CPU 20. The timekeeping circuit 31 incorporates a timekeeping that measures time. The timekeeping circuit 31 is the known type circuit that compares the present time with the time when time-measuring was started and calculates the period that as elapsed from the start of the time measuring. Then, the timekeeping circuit 31 inform the CPU 20 of the present time and the period thus calculated.

The ROM 21 is a nonvolatile memory in which data cannot be rewritten. The ROM 21 stores various control programs, such as log-creating program 21*a* and easy-log transmitting program 21*b* that the CPU 20 may execute. The ROM 21 further stores fixed data items.

The log-creating program 21*a* is a program that the CPU 20 executes to generate log items about the operation of the printer 10*a* and to store these log items in a detail log area 23*a*, which will be described later. By executing the program 21*a*, the CPU 20 store those of the log items, which influence the operation of the printer 10*a*, as easy log items, in an easy log area 22*a*, which will be described later.

The log items concerning the operation of the printer 10*a* are recorded information items about, for example, the control signals that the printer 10*a* has received from the PC 11, the information about the data that the printer 10 has transmitted and received to and from the PC 11, the information about the control signals that the CPU 20 has output to respective parts of the printer 10*a*, the operation results (e.g., success or failure), and the information about troubles in the printer 10*a*. The CPU 20 activates and executes the log-creating program 21*a* when any trouble that should be logged takes place.

A detail log 61 which are stored into the detail log area 23*a* and an easy log 62 which are stored into the easy log area 22*a* by the log-creating program 21*a* will be explained with reference to FIGS. 2(*a*) and 2(*b*). FIG. 2(*a*) is a schematic diagram illustrating the contents of the detail log 61 stored in the detail log area 23*a*.

As FIG. 2(a) shows, the detail log 61 has time 61a, identification number 61b, type 61c and content 61d pertaining to each log item. The time 61a is the data acquired from the timekeeping circuit 31 when the log-creating program 21a generated the log item. The identification number 61b is the serial number of the log item and is incremented by one every time a log item is generated. The PC 11 or any person may use the identification number 61b in order to associate the detail log 61 with the easy log 62 stored in the easy log area 22a.

The type 61c represents the type of the content of the log item, "INF," "WRN" or "ERR." Any log item of "INF" type is an information log item showing an ordinary operation. Any log item of "WRN" type is a warning log item showing an operation that may induce a trouble in the future Any log item of "ERR" type is an error log item showing an operation that may result in a great consequence. The content 61d is a character string that represents the specific content of the log item.

The detail log 61 consists of all log items about the operation of the printer 10a, as described above. More precisely, the detail log 61 is composed of an information log item, a warning log item and an error log item. If the detail log 61 is used, any unusual event occurring in the printer 10a can be easily identified.

FIG. 2(b) is a diagram schematically illustrating the contents of the easy log 62 stored in the easy log area 22a. As shown in FIG. 2(b), the easy log 62 is composed of only two of the items that constitute the detail log 61, i.e., the warning log item and error log item indicating that the log may adversely influence the operation of the printer 10a. If the easy log 62 is used, any trouble in the printer 10a can be tracked down to some extent, in accordance with the warning log item and the error log item. Further, a volume of data of the easy log 62 is smaller than a volume of data of the detail log 61 and is therefore advantageous over the detail log 61.

Referring back to FIG. 1, the log collecting system 1 will be described further. The easy-log transmitting program 21b sends to the PC 11 the easy log 62 stored in the easy log area 22a. The CPU 20 activates and executes the easy-log transmitting program 21b when the printer 10a receives an easy-log requesting command from the PC 11. Executing this program, the CPU 20 acquires the present-time data from the timekeeping circuit 31 when the easy log 62 is transmitted and transmits the present-time data and the easy log 62. If the easy log 62 is not stored in the easy log area 22a, the CPU 20 transmits null data, in place of the present-time data the easy log 62.

The RAM 22 is a volatile memory in which data can be rewritten, various data items can be temporarily stored in the RAM 22. The RAM 22 has the easy log area 22a. The easy log area 22a is provided to store the easy log 62 generated by the log-creating program 21a. The easy log area 22a cannot be directly accessed from the PC 11. Nonetheless, the PC 11 can acquire the easy log 62 stored in the easy log area 22a, by issuing an easy-log requesting command.

The EEPROM 23 is a nonvolatile memory in which data cannot be rewritten. The EEPROM 23 functions as a device having a removable storage area that the PC 11 can directly access. The EEPROM 23 has a detail log area 23a and an identification number counter 23b. The detail log area 23a is an area in which the detail log 61 generated by the log-creating program 21a is stored. In the detail log area 23a, the items of the detail log 61 are stored in the order they have been generated by the log-creating program 21a, that is, in the ascending order of the identification numbers 61b. The detail log area 23a is a removable storage area. The PC 11 can directly access the detail log 61 stored in the detail log area 23a and can therefore copy the contents of the detail log 61. Because the detail log area 23a is provided in the EEPROM 23, the detail log remains held in the detail log area 23a even if the user turns off the power switch of the printer 10a when an error takes place. Therefore, when the user turns on the printer 10a again, the PC 11 can acquire the detail log stored in the detail log area 23a.

The identification number counter 23b is a counter that is used to generate the identification numbers 61b shown in FIG. 2(a). The identification number counter 23b is referred to, in order to make the log-creating program 21a generate the log. The count is incremented by one every time the log-creating program 21a refers to the count. Note that the counter 23b is set to "0" when the printer 10a is shipped from the factory.

The gate array 24 is connected to an image memory 32 configured to store image data that should be printed on a recording medium. In accordance with a print timing signal transferred from the CPU 20, the gate array 24 outputs print data (drive signal), a transfer clock, a latch signal, a parameter signal, and an ejection-timing signal. The print data is used to print the image data on a recording medium. The transfer clock is synchronous with the print data. The parameter signal is used to generate a basic print-waveform signal. The ejection-timing signal is output at prescribed intervals. These signals are output to the head driver 25.

The gate array 24 is connected to an interface 33 that may be connected to the PC 11 by a communication line 40a. The gate array 24 can receive image data transferred from the PC 11 via the interface 33. The image data thus received is stored in the image memory 32.

The head driver 25 is a drive circuit that supplies drive pulses to the drive elements associated with the nozzles made in the ink-jet head 3, in response to a signal output from the gate array 24. The drive pulses drive the drive elements, which eject ink through the respective nozzles.

The scanner 10b is a peripheral device having a document table (not shown). The scanner 10b reads an image from the document set on the document table and generates image data representing the image. The image data is transmitted to the PC 11. The facsimile 10c is a peripheral device that can receive image data from the PC 11 and transmit the image data to another facsimile via the telephone line (not shown), and can receive image data from another facsimile and transmit the image data to the PC 11. The components that perform the major functions of the scanner 10b and facsimile 10c have the configurations known in the art. The components of the scanner 10b and facsimile 11c, which generate and store a detail log 61 and an easy log 62 and transmit the easy log to the PC 11, are identical to the configuration of the printer 10a. Therefore, the electrical configurations of the scanner 10b and facsimile 10c will not be shown or described.

The PC 11 is a computer that cooperates with the peripheral devices, i.e., the printer 10a, scanner 10b and facsimile 10c, to perform the processes the user wants them to do. The PC 11 includes a CPU 41, a ROM 42, a CAM 43, a hard disk drive (hereinafter abbreviated to "HDD") 44, a liquid crystal display 46 (hereinafter abbreviated to "LCD"), a Keyboard 47 and an Interface 48. Each of the HDD 44, the liquid crystal display 46, the Keyboard 47, and the Interface 48 are connected via an Input/output (hereinafter abbreviated to "I/O") port 49. Each of the CPU 41, the ROM 42, the RAM 43, and the I/O port 49 are connected via a Bus line 50.

The CPU 41 is a processing unit that controls the pc 11 in accordance with a control program stored in the ROM 42 and the HDD 44. A timekeeping circuit 45 is connected to the CPU 41. The timekeeping circuit 45 is the known type circuit that functions similarly to the timekeeping circuit 31.

The ROM 42 is a nonvolatile memory in which data cannot be rewritten. The ROM 42 stores various control programs, such as controlling program that executed by the CPU 41 and fixed values, and so forth. The RAM 43 is a volatile memory in which data can be rewritten. Various data such as an acquisition flag 43*a* can be temporarily stored in the RAM 43.

The acquisition flag 43*a* may be set to "1" to indicate that a device monitoring program 44*a* is acquiring easy logs from the printer 10*a*, scanner 10*b* and facsimile 10*c*. (Hereinafter, the process of acquiring the easy logs will be called "easy-log acquiring process".) when the device monitoring program 44*a* starts the easy-log acquiring process, the acquisition flag 43*a* is set to "1". When the easy-log acquiring process is completed, the acquisition flag 43*a* is set to "0." Note that the acquisition flag 43*a* is set to "0" as initial value when the power switch of the PC 11 is turned on.

The acquisition flag 43*a* is referred to in the process performed by a log collecting program 44*b*, which will be described later. The acquisition flag 43*a* is used to prevent the device monitoring program 44*a* and the log collecting program 44*b* from performing one easy-log acquiring process and another easy-log acquiring process, respectively.

The HDD 44 is a nonvolatile memory in which data can be rewritten. The HDD 44 stores a device monitoring program 44*a*, a log collecting program 44*b* and an application program 44*c*. These programs are executed by the CPU 41. The HDD 44 also stores registry 44*d* and a log folder 44*e*.

The device monitoring program 44*a* is a program that performs an easy-log acquiring process, i.e., a process of acquiring easy logs at regular intervals from all peripheral devices (i.e., the printer 10*a*, scanner 10*b* and facsimile 10*c*) that are connected to the PC 11. As described above, the device monitoring program 44*a* sets the value of the acquisition flag 43*a*, either "1" or "0", at the start or end of the easy-log acquiring process. The device monitoring program 44*a* is activated when the power switch of the PC 11 is turned on. The CPU 41 keeps executing the device monitoring program 44*a* until the power switch is turned off or the user inputs program-terminating instructions.

In the easy-log acquiring process, an easy log requesting command is transmitted to all peripheral devices, in order to acquire easy logs from the peripheral devices, respectively. At this point, the CPU 41 corrects the time described in each easy log, based on the time interval between the present time at the peripheral device, which has been transmitted along with the easy log, and the present time at the PC 11, which has been acquired from the timekeeping circuit 45. The time described in the easy log is thus adjusted to the time axis applied in the PC 11. The easy logs of the peripheral device, thus corrected, are held in the sub-folders associated with the respective peripheral devices and provided in the log folder 44*e*. The log folder 44*e* will be described later.

The log collecting program 44*b* is a program that compiles the PC log generated by the PC 11 and stored in the log folder 44*e* (described later), the easy logs and detail logs generated by the peripheral devices, and the necessary ones of the registries stored in the registry 44*d* (later described). Compiling these logs, the log collecting program 44*b* generates a collected log file. The log collecting program 44*b* is activated and executed in response to the instructions by the user and is executed prior to the generation of the collected log file, acquiring the easy logs and the detail logs. The latest easy log and the latest detail log can be thereby acquired from each peripheral device.

If the acquisition flag 43*a* is "1", the easy-log acquiring process is being performed by the device monitoring program 44*a*. Therefore, the log collecting program 44*b* does not perform an easy-log acquiring process and remains in the standby state until the device monitoring program 44*a* finishes the easy-log acquiring process. This prevents the easy-log acquiring process from being performed by both the device monitoring program 44*a* and the log collecting program 44*b*.

In the detail-log acquiring process, detail logs of all peripheral devices are copied, and the time data items described in the respective detail logs are corrected. (Hereinafter, the process of correcting the time data items will be called "detail-log time correcting process.") The digital log of each peripheral device, which has been subjected to the detail-log time correcting process, is held in the sub-folder provided in the log folder 44*e* and associated with the device.

In the detail-log time correcting process, an easy log may be acquired from any peripheral device whose detail log has been copied. If this is the case, the time described in the detail log of the same identification number as the identification number described in the easy log is replaced by the time described in the easy log having the same identification number. Thus, the time described in the warning log item and error log item, both contained in the easy log, as well as in the detail log, can be adjusted to the time axis applied in the PC 11. Because the detail log describes identification numbers, each incremented by one with respect to the immediately preceding one, the time the information log was generated with respect to the time axis applied in the PC 11 can be inferred from the time that has been replaced for the warning log item and error log item.

In the detail-log time correcting process, the easy log may not be acquired from any peripheral device whose detail log has been copied. In this case, a marker is added to the detail log, showing all time data items described in the detail log are used in the peripheral device. By using this marker, anyone who refers to the log can recognize that the time data items described in the detail log are those used in the peripheral device.

The application program 44*c* is a program that the CPU 41 may execute to perform a specific process. When a control signal or data is supplied and received to and from each peripheral device, by using the application program 44*c*, the application program 44*c* (more precisely, the CPU 11) generates a log. The log (PC log) generated by the application program 44*c* contains the information about the control signals and data transmitted and received to and from the peripheral device, the information about the results of operation in the peripheral device and the information about operation errors (The information about the results of operation represents, for example, the success or failure of the operation.) Each of the PC log describes the time data acquired from the timekeeping circuit 45 when the log was generated by using the application program 44*c*, the logotype data identifying the type of the log (information log, warning log, or error log) and a character train representing the contents of the log. The application program 44*c* adds the PC log to the PC log file provided for the peripheral device and held in the log folder 44*e*.

The registry 44*d* is a database that stores the setting data about the operation system (OS) of the PC 11 and the application program 44*c*. The registry 44*d* describes the names, vendor names, port numbers, IP addresses and node names of the peripheral devices connected to the PC 11. From the information described in the registry 44*d*, the device monitoring program 44*a* and the log collecting program 44*b* can acquire the information about any peripheral device, from which a easy log or a detail log should be acquired.

The log folder 44e stores the PC logs generated by the application program 44c and the easy and detail logs acquired from the peripheral devices by the device monitoring program 44a and log collecting program 44b. The configuration of the log folder 44e will be described with reference to FIG. 2(c). FIG. 2(c) is a schematic diagram showing the configuration of the log folder "log" (hereinafter called "log" folder).

As shown in FIG. 2(c), the "log" folder includes a PC log folder "PC log" (hereinafter called "PC log" folder) and a device log folder "Device log" folder (hereinafter called "Device log" folder). The "PC log" folder holds a PC log. The "Device log" folder holds the easy and detail logs each peripheral device has generated. Further, the "Device log" folder includes sub-holders provided for the respective peripheral devices. The sub-holders have names identical to the peripheral devices (or trade numbers) associated to them. That is, the sub-folder associated with the printer 10a is named "Printer" is called "Printer" folder, the sub-folder associated with the scanner 10b that is named "Scanner" is called "Scanner" folder, and the sub-folder associated with the facsimile 10c that is named "Fax" is called "Fax" folder.

The "PC log" folder stores the PC log files prepared for each of the peripheral devices. More specifically, the "PC log" folder stores a "Printer. log" file, a "Scanner. log" file and a "Fax. log" file. The "Printer. log" file stores the PC log generated in the process the application program 44c has performed on the printer 10a. The "Scanner. log" file stores the PC log generated in the process the application program 44c has performed on the scanner 10b. The "Fax. log" file stores the PC log generated in the process the application program 44c has performed on the facsimile 10c. Further, in the "Pinter" folder, the "Scanner" folder and the "Fax" folder, an easy log file "easy.log" and a detail log file "Detail.log" are stored. The easy log file "easy.log" holds the easy log acquired from the associated peripheral device. The detail log file "Detail.log" holds the detail log acquired from the associated peripheral device.

The "log" folders are compressed and encrypted into a collected log file by the log collecting program 44b, each preserving the folder configuration, together with the necessary registry information.

Next, the sequences that the log collecting system 1 operates in the normal operating mode and in the log-collecting mode will be described with reference to FIGS. 2(d)-2(e). FIG. 2(d) is a sequence chart showing the sequence of operation the log collecting system 1 performs in normal operating mode. FIG. 2(e) is a sequence chart showing the sequence of operation the log collecting system 1 performs in the log-collecting mode. In the normal operating mode, after the power source of the PC 11 and the printer 10a is turned on, the system 1 performs ordinary processes. In the log-collecting mode, the PC 11 is started and executes the log collecting program 44b. In FIGS. 2(d) and 2(e), only one peripheral device, i.e., printer 10a is illustrated. Because similar processes are performed in the scanner 10b and facsimile 10c, display and explanation of the scanner 10b and facsimile 10c have been omitted.

In the normal operating mode, as shown in FIG. 2(d), the PC 11 executes the process of the application program 44c, transmitting and receiving control signals and data to and from the peripheral devices, and generates a PC log. The PC log is added to the PC log files prepared for the peripheral devices, respectively (1). Meanwhile, in the printer 10a, the log-creating program 21a generates a log about the operation of the printer 10a. The entire log generated is stored, as detail log, in the detail log area 23a (2). Moreover, the warning log and error log included in the detail log are stored, as easy log, in the easy log area 22a (3).

The device monitoring program 44a in the PC 11 transmits an easy-log requesting command to the printer 10a (4). On receiving the easy-log requesting command from the PC 11, the easy-log transmitting program 21b reads an easy log from the easy log area 22a (5). The program 21b then acquires the present-time data of the printer 10a from the timekeeping circuit 31 (6). Further, the program 21b transmits the easy log, together with the present-time data, to the PC 11 (7).

On receiving the easy log and the present-time data, the device monitoring program 44a in the PC 11 adjusts the time described in the easy log to the time axis applied in the PC 11. Then, the device monitoring program 44a stores the easy log describing the time corrected, in the sub-folder included in the log folder 44e that is provided for the peripheral device (8).

Thus, in the normal operating mode, the log generated by the application program 44c and the easy log generated in the printer 10a are stored in the log folder 44e.

In the log-collecting mode, as shown in FIG. 2(e), the log collecting program 44b determines the value of the acquisition flag 43a (11). If the acquisition flag 43a is "1", the device monitoring program is performing the easy-log acquiring process. In this case, the log collecting program 44b does not perform the easy-log acquiring process and remains in the standby state until the device monitoring program 44a finishes the easy-log acquiring process. When the easy-log acquiring process is completed, the process (17) is performed.

If the acquisition flag 43a is "0," the log collecting program 44b transmits an easy-log requesting command to the printer 10a (12). On receiving the easy-log requesting command, the easy-log transmitting program 21b in PC11 performs processes similar to those (5) to (8) performed in the normal operating mode shown in FIG. 2(d), in the steps (13) to (16), respectively. In this case, the latest easy log describing the time corrected is stored in the sub-folder included in the log folder 44e that is provided for the peripheral device.

Next, the log collecting program 44b copies the detail log from the detail log area 23a in the printer 10a (17). The log collecting program 44b further corrects the time, which is described in the warning log and error log included in the detail log, to the time axis applied in the PC and stores the warning log and error log in the log folder 44e (18). The log generated in the PC 11 and the easy and detail logs generated in the printer 13a are stored in the log folder 44e. Then, the log collecting program 44b compresses and encrypts the contents of the log folder 44e, generating one collected-log file. The collected-log file is output, with the folder configuration of the contents preserved (20). Therefore, the user or the vendor can easily identify the cause of a trouble in any process the PC 11 performs by analyzing this collected-log file.

Next, a log preparing process executed by the CPU 20 of the printer 10a will be described with reference to FIG. 3. FIG. 3 is a flowchart explaining the log preparing process performed in the printer 10a. The CPU 20 performs this process by activating the log-creating program 21a, when an event that should be logged takes place in the printer 10a.

In this process, the CPU 20 acquires an identification number from the identification number counter 23b (S101). Then, the CPU 20 generates a log character string from the nature of the event that has taken place in the printer 10a (S102). As shown in FIG. 2(a), the log character string represents an identification number 61b, type 61c and content 61d. Further, the CPU 20 acquires the present-time data is acquired from the timekeeping circuit 31, and adds the time data 61a to the head of the log character string generated in S102 (S103). Then, the CPU 20 adds the log character string obtained in S103, as detail log 61, and stores this log character string in the detail log area 23a (S104). The data about the event that has occurred in the printer 10a is thereby stored in detail log area 23a.

Then the CPU 20 increments the count of the identification number counter 23b by "1" (S105). The identification number 61b described in the detail log 61 generated to prepare is therefore incremented by "1". Hence, the detail log can be identified by referring to the identification number 61b.

Next, the CPU 20 determines whether the type 61c of the log character string acquired in S103 is a warning log "WRN" or an error log "ERR" (S106). If the type 61c is neither a warning log "WRN" nor an error log "ERR" (No in S106), the process is terminated. If the type 61c is a warning log "WPN" or an error log "ERR" (Yes in S106), the CPU 20 advances to S107.

The process from S107 to S110 is a process of storing the log character string acquired in S103 in the easy log area 22a. First, in S107, the CPU 20 acquires the vacant part of the easy log area 22a. In S108, the CPU 20 determines whether the volume of the vacant part is large enough to store the log character string. If the volume of the vacant part is not large enough to store the log character string is determined (No in S108), the CPU 20 deletes the easy log G2, which has been stored longer in the easy log area 22a than any other data items (S109). The CPU 20 repeats the process of S107 through S109 while the volume of the vacant part of the easy log area 22a is smaller than the volume of the log character string. A storage area can thereby be provided in the easy log area 22a, for the log character string acquired in S103.

When the CPU 20 determines the volume of the vacant part is found to be large enough to store the log character string (Yes in S108), in S110 the CPU 20 adds the log character string acquired in S103 and stores this log character string as easy log 62 in the easy log area 22a. Then, the CPU 20 ends the process. Thus, the log is stored as easy log 62 in the easy log area 22a if the problem that has occurred in the printer 10a may be serious in the future or may result in a grave consequence. More precisely, if the type 61c included in the detail log 61 is a warning log "WRN" or an error log "ERR", the type 61c will be stored as easy log 62. In this process, the same log character string acquired in S103 is stored in the detail log 61 and the easy log 62, therefore, the identification numbers given at the same incidence are the same in the detail log 61 and the easy log 62 By using this identification number, checking the detail log 61 and the easy log 62 can be easily executed.

Figure 4:
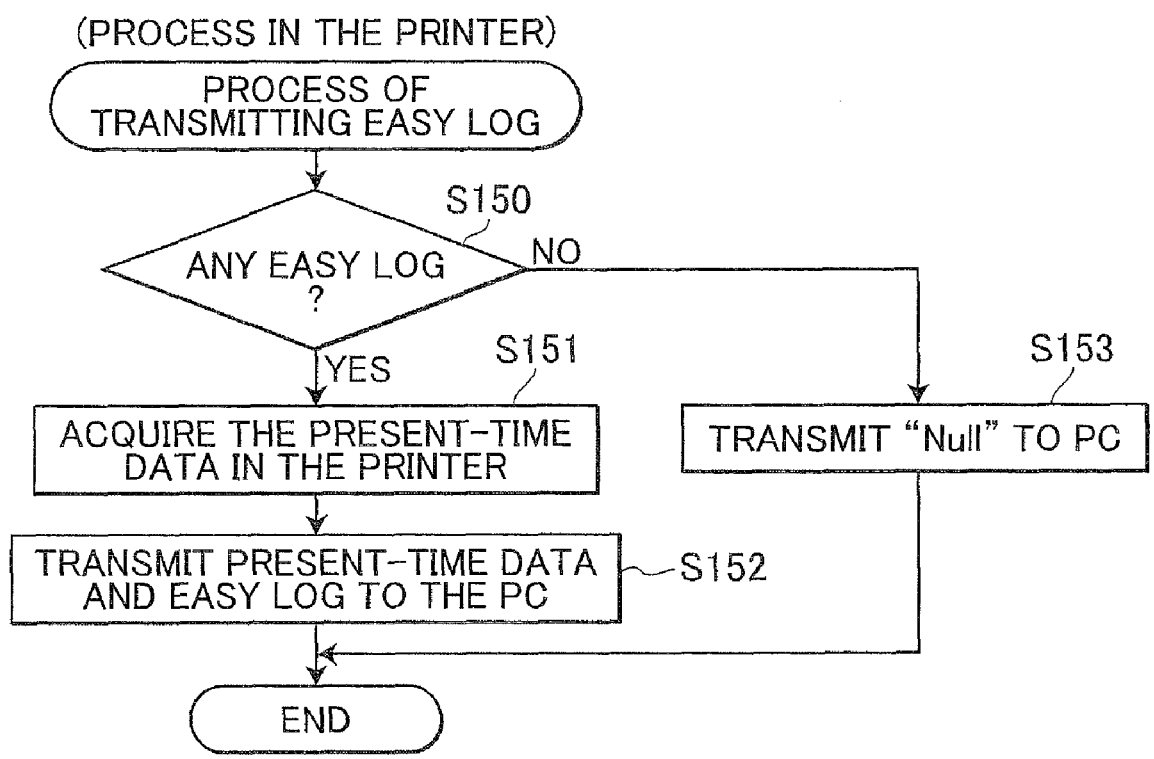
FIG. 4 is a flowchart showing the easy-log transmitting process performed in the printer.

Next, an easy-log transmitting process executed by the CPU 20 of the printer 10a will be described with reference to FIG. 4. FIG. 4 is a flowchart showing the easy-log transmitting process. This process is performed when the CPU 20 starts the easy-log transmitting program 21b when the printer 10a receives an easy-log requesting command transmitted from the PC 11.

In the easy-log transmitting process, the CPU 20 determines whether an easy log exists in the easy log area 22a (S150). If an easy log exists in the easy log area 22a (Yes in S150), the CPU 20 acquires the present-time data from the timekeeping circuit 31 (S151). Next, the CPU 20 transmits the present-time data acquired in S151 and the easy log stored in the easy log area 22a to the PC 11 (S152) and ends this process. Because the present-time data and the easy log are transmitted to the PC 11, the PC 11 can perform the easy-log acquiring process, adjusting the time described in the easy log to the time axis applied in the PC 11.

If no easy logs are found to exist in the easy log area 22a (if No in 5150), the CPU 20 transmits null data "Null" (hereinafter referred to as "Null" data) to the PC 11 (S153) and ends this process. As a result, the PC 11 can determine that no easy logs exist in the printer 10a.

Figure 5:
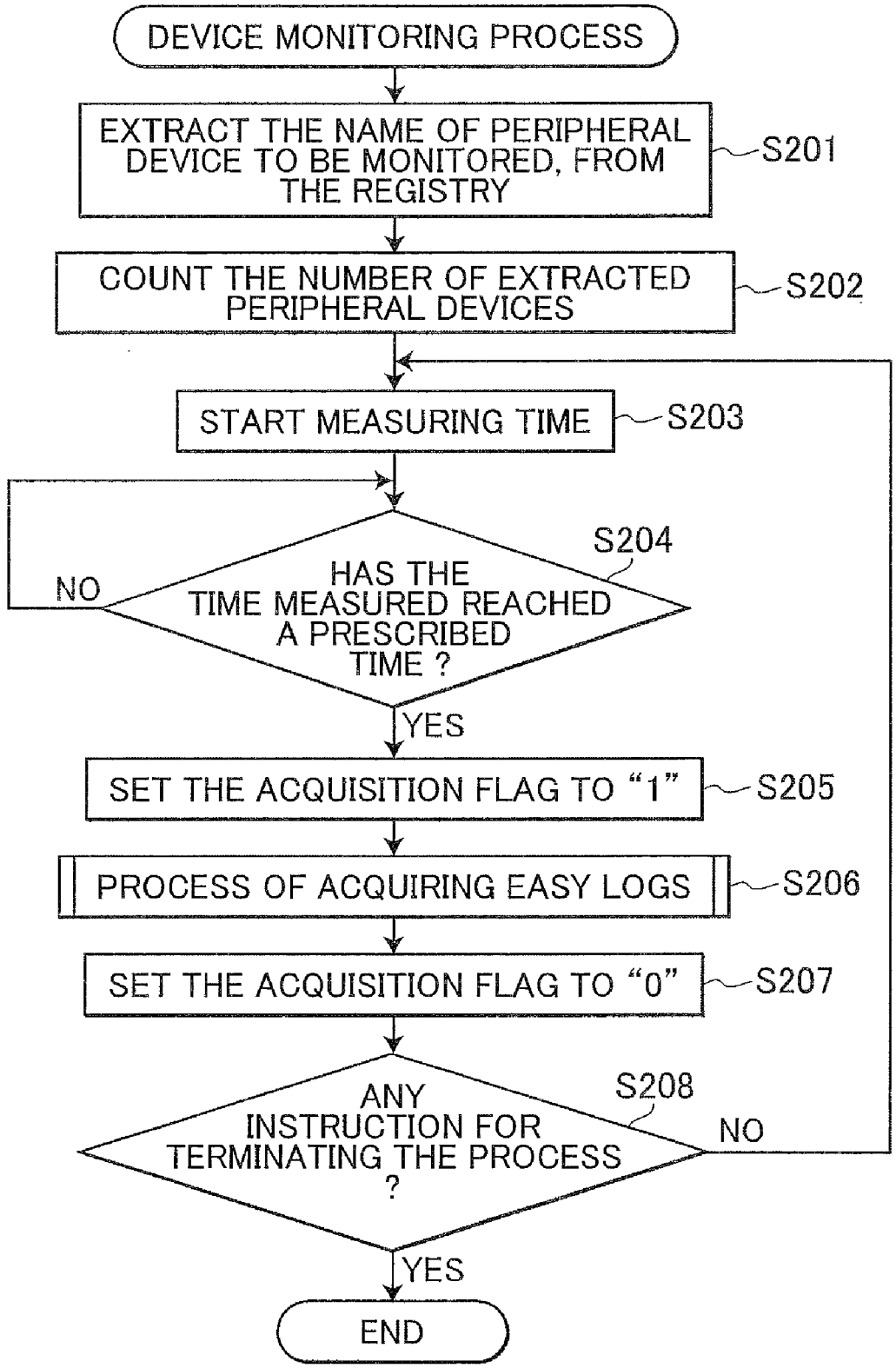
FIG. 5 is a flowchart showing the device monitoring process performed by a PC.

Next, the device monitoring process executed by the CPU 41 of the PC 11 will be described with reference to FIG. 5. FIG. 5 is a flowchart showing the device monitoring process. This process is initiated when the CPU 41 starts the device monitoring program 44a as the PC 11 is turned on.

In this process, the CPU 41 extracts the device name of a peripheral device the PC 11 should monitor, based on the device names or vendor names of the peripheral devices, which are described in the registry 44d (S201). The CPU 41 then acquires the easy log or detail log of any peripheral device that should be monitored. Further, the CPU 41 acquires data items about the peripheral device to monitor, such as the device name, port number, IP address and node name, from the registry 44d. The easy log or detail log and the data items, all pertaining to the peripheral device to monitor, are stored in the RAM 42. At this point, serial numbers, starting with "0", are assigned to the peripheral devices to monitor. Thereafter, the easy-log acquiring process and the detail-log acquiring process will be performed on the peripheral devices, one after another, in accordance with the serial numbers assigned to the peripheral devices.

Subsequently, the CPU 41 counts the number of the extracted peripheral devices and stores this number in the RAM 42 (S202). The count N stored will be used in the process of acquiring the easy logs or detail logs from all peripheral devices that are monitored.

Next, by using the timekeeping circuit 45, the CPU 41 starts measuring time (S203). Then the CPU 41 determines whether the time measured by the timekeeping circuit 45 has reached a prescribed time or not (S204). If the time measured has not reached the prescribed value (No in S204), the CPU 41 repeats the process of S204 until the time measured reaches the prescribed value. If the time measured has reached the prescribed value (Yes in S204), the CPU 41 advances to S205. As a result, before S205, the CPU 41 can creates prescribed time counted by the timekeeping circuit 45. Thus, the CPU 41 can execute the easy-log acquiring process at regular intervals.

In S205, the CPU 41 set the acquisition flag 43a to "1". Then, the CPU 41 executes the easy-log acquiring process described later acquiring the easy log from each peripheral device (S206). When the easy-log acquiring process (S206) is completed, the CPU 41 sets the acquisition flag 43a to "0" (S207). As a result, the acquisition flag 43a therefore indicates that the easy-log acquiring process proceeds during the device is being monitored. Thus, the acquisition flag 43a prevents the log collecting program 44b form performing another easy-log acquiring process.

The CPU 41 determines whether the PC 11 has been turned off, or the instruction to end the device monitoring program 44a is input by the user (S208). It the user has instructed to end the device monitoring program 44a (Yes in S208), the CPU 41 ends this process. If the user has not instructed to end the device monitoring program 44a (No in S208), the CPU 41 returns to S203 and repeats the process of S203 through S208 until the CPU 41 detects the instruction to end the process. As a result, the easy-log acquiring process can therefore be performed at regular intervals, whereby the easy logs are acquired from the respective peripheral devices.

Figure 6:
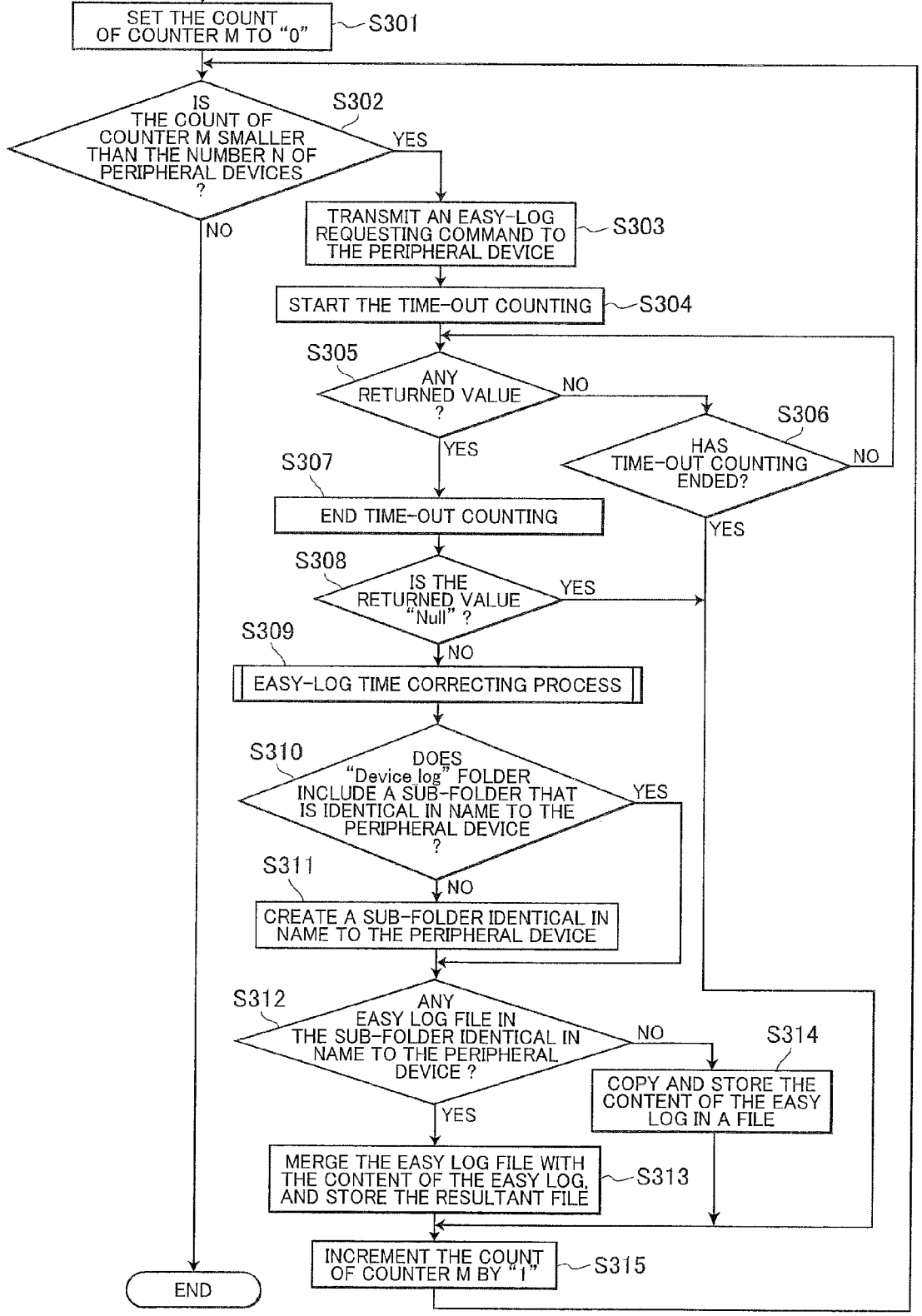
FIG. 6 is a flowchart showing the easy-log acquiring process performed in the PC.

Next, the easy-log acquiring process executed by the CPU 41 of the PC 11 will be described with reference to FIG. 6. FIG. 6 is a flowchart showing the easy-log acquiring process. This is a process of acquiring an easy log from any peripheral device to monitor and is executed by the CPU 41 during the device monitoring process that has been described above or during the log collecting process that will be described later.

In this process, the CPU 41 sets a counter M is set in the RAM 43 at first and sets count of the counter M to "0" (S301). The counter M is a counter for counting loops of the process of acquiring easy logs from all peripheral devices that are monitored during the easy-log acquiring process.

Subsequently, the CPU 41 determines whether the count of the counter M is smaller than the number N of peripheral devices, which is held in the RAM 43 during the device monitoring process (S302). S302 is a process of determining whether the process loop of acquiring easy logs from the peripheral devices has been completed. If the count of the counter M is equal to or larger than the number N (No in S302), the CPU 41 determines the process of acquiring easy logs from the peripheral devices has been completed, and ends this process.

If the count of the counter M is smaller than the number N (Yes in S302), the CPU 41 advances to S303. S303 to S315 are equivalent to the process of acquiring easy logs from the respective peripheral devices. First, in S303, of the information concerning the peripheral devices and held in the RAM 43 during the device monitoring process, the CPU 41 reads out the data about the peripheral device of the serial number identical to the count of the counter M, and transmits an easy-log requesting command to this peripheral device. Next, by using the timekeeping circuit 45, the CPU 41 starts time-out counting (S304). The time-out counting is initiated in order to determine whether each peripheral device gives a returned value within a prescribed time, in response to the easy-log requesting command transmitted in S303.

Next, the CPU 41 determines whether the peripheral device has given a returned value in response to the easy-log requesting command in S305. If the peripheral device has given no returned values (No in S305), the CPU 41 determines whether the time-out counting has ended (S306). If the time-out counting has not ended (No in S306), the CPU 41 returns to S305, and determines whether the peripheral device has given a returned value again. If the time-out counting has ended (in S306), the CPU 41 determines the peripheral device is unable to transmit the returned value. In this case, the CPU 41 advances to S315, so that an easy log may be acquired from another peripheral device. Note that any peripheral device cannot transmit the returned value when the peripheral device has been turned off or when a trouble has developed in the communications path between the PC 11 and the peripheral device.

If the peripheral device is found to have given the returned value in response to the easy-log requesting command (Yes in S305), the CPU 41 ends the time-out counting (S307). Then, the CPU 41 determines whether the returned value is "Null" data and if the returned value is "Null" data (Yes in S308), the CPU 41 determines the peripheral device has no easy logs. In this case, the CPU 41 advances to S315 in order to acquire an easy log from another peripheral device. If the returned value may not be "Null" data (No in S308), the CPU 41 determines the returned value contains the present-time data and an easy log. Then, the CPU 41 extracts an easy-log time correcting process described later (S309), and adjusts the time described in the easy log to the time axis applied in the PC 11, based on the present-time data set in the peripheral device and the present-time data set in the PC 11.

Subsequently, the CPU 41 determines whether "Device log" folder in the log folder 44e includes a sub-folder whose name is identical to the name of a peripheral device that has acquired an easy log (S310). The easy log, for which the time has been corrected, is stored in the subs folder whose name is identical to the name of the peripheral device. If "Device log" folder includes a sub-folder whose name is identical to the name of the peripheral device (Yes in S310), the CPU 41 advances to S312. If "Device log" folder does not include such a sub-folder (No in S310), the CPU 41 creates a sub-folder whose name is identical to that of the peripheral device is formed in the "Device log" folder (S311) and then advances to S312.

In S312, the CPU 41 determines whether an "easy. log" file, which is an easy log file, exists in the sub-folder whose name is identical to the name of the peripheral device. If an "easy. log" file exists in the sub-folder (Yes in S312), the CPU 41 merges the content of the easy log with the "easy. log" file (S313). At this point, the identification number of the easy log which is stored in the "easy.log" file is compared with the identification number of the easy log included in the returned value acquired in S305. If an easy log having the same identification number exists, this easy log is regarded as one once acquired in the past and is not merged with the "easy. log" file. As a result, this can prevent identical easy logs, if any, from being described together in the "easy.log" file. When S313 is completed, the CPU 41 advances to S315.

If an "easy.log" file is not found to exist, in S312 (No in S312), the CPU 41 creates an "easy. log" file in the sub-file whose name is identical to that of the peripheral device which has acquired the easy log, and copies the content of the easy log corrected in terms of time in the "easy.log" file (S314). Then, the CPU 41 advances to S315.

In S315, the CPU 41 increments the count of the counter M by "1" and returns to S302. As a result, the CPU 41 can execute the process of acquiring an easy log from any other peripheral device.

Next, the easy-log time correcting process executed by the CPU 41 of the PC 11 will be described with reference to FIG. 7. FIG. 7 is a flowchart showing the easy-log time correcting process. This process is performed by the CPU 41 during the easy-log acquiring process described above, when the time data described in the easy log is adjusted to the time axis applied in the PC 11.

In this process, the CPU 41 acquires the present-time data from the timekeeping circuit 45 (S401). Next, the CPU 41 acquires the present-time at the peripheral device from the returned value acquired for the peripheral device during the easy-log acquiring process (S402). The CPU 41 calculates the time interval between the present time at the PC 11 and the present time at the peripheral device (S403). The CPU 41 adds the time interval thus calculated to the time data described in the easy log, thus correcting the time data, and overwrites the time data thus corrected in the easy log (S404). Then, the CPU 41 ends this process. As a results, this can adjust the time data described in the easy log to the time axis applied in the PC 11. The order can therefore be reliably recognized, in which the easy log and the log described in the PC log file generated by the application program 44c in the PC 11 are generated. The load of analyzing the cause of any trouble can therefore be reduced.

Next, the log collecting process executed by the CPU 41 of the PC 11 will be described with reference to FIG. 8. FIG. 8 is a flowchart showing the log collecting process. This process is performed when the CPU 41 starts the log collecting program 44b in response to the instructions the user has input.

In this log collecting process, first, the CPU 41 executes the process of acquiring the easy log from any peripheral device that should be monitored. In S501, the CPU 41 determines whether the acquisition flag 43a is "1" (S501). If the acquisition flag 43a is "1" (Yes in S501), the CPU 41 advances to S502 because the easy-log acquiring process has been performed as determined in the device monitoring process. In S502, the CPU 41 determines whether the acquisition flag 43a has changed to "0". If the acquisition flag 43a remains "1" (No in S502), the CPU 41 repeats S502 is repeated. If the acquisition flag 43a has changed to "0" (Yes in S502), the CPU 41 determines whether the easy log has been completed during the device monitoring process and then advances to S504. In 5501, if the acquisition flag 43a is "0" (No in S501), the CPU 41 executes the easy-log acquiring process (S502), and advances to S504.

In the easy-log acquiring process, the easy log is acquired from the peripheral device being monitored. The easy log file of any peripheral device, which is stored in a sub-folder included in the "Device log" folder and whose name is identical to that of the peripheral device, is updated to the latest state. Further, if the easy-log acquiring process proceeds during the device monitoring process, another easy-log acquiring process can be prevented from being performed unnecessarily.

In S504, the CPU 41 executes a detailed-log acquiring process described later. As a result, detail logs are thereby copied from all peripheral devices to monitor. The detail logs thus acquired are stored in the sub-files whose names are identical to those of the peripheral devices in the "Device log" folder.

Next, the CPU 41 creates a work folder in which to form collection files in the HDD 44 (S505). The CPU 41 reads out the value of a registry 44d that should be collected as a log and stores the value thus read is made into a text file in the work folder (S506). Subsequently, the CPU 41 copies the log folder 44e (i.e., 'log' folder) in untouched configuration, in the work folder (S507).

In S508, the CPU 41 copies the collection folder and stores this collection folder in the work folder. In S509, the CPU 41 creates a collection log file by compressing and encrypting the work folder. That is, in S509, the CPU 41 creates one collection log file by compressing and encrypting the work folder in which the value of the registry 44d and the work folder holding the "log" folder is stored with folder configuration untouched, and copies the collection log file in the desktop folder provided in the HDD 44 by using the OS. In S510, the CPU 41 deletes unnecessary work folder and ends this process.

Thus, the log collecting process is performed, merely by inputting from the user the instruction for the execution of the log collecting program 44b. Therefore, a detail log can be acquired from each peripheral device and a collected log file can be immediately generated. The user may analyze the collected log file generated in the log collecting process, to confirm the value of the registry 44d and various log files, which are stored in the collected log file. The user can therefore identify the cause of any trouble that has occurred while the PC 11 is executing processes. Moreover, since the configuration of the "log" folder is preserved in the collected log file, the name of any peripheral device, from which an easy log and a detail log have been acquired, is associated with both the easy log and detail log. Hence, the peripheral device that has generated the easy log and detail log can be easily identified.

Next, the detail-log acquiring process executed by the CPU 41 of the PC 11 will be described with reference to FIG. 9(a).

FIG. 9(a) is a flowchart showing this process. This process is executed to acquire a detail log from any peripheral device corresponding to the monitoring target. The CPU 41 executes this process during the log collecting process described above.

In this process, a counter M is provided in the RAM 43. First, the CPU 41 calculates by substituting "0" as an initial value for the counter M (S601). The counter M counts loops of the process of acquiring detail logs from all peripheral devices that are monitored during the detail-log acquiring process.

Subsequently, the CPU 41 determines whether the count of the counter M is smaller than the number N of peripheral devices which is held in the RAM 43 during the device monitoring process (S602). In S602, the CPU 41 determines whether the process loop of acquiring detail logs from the peripheral devices has been completed. If the count of the counter M is equal to or greater than the number N (No in S602), the CPU 41 determines detail logs have been acquired from all peripheral devices to monitor. In this case, the detail-log acquiring process is terminated.

If the count of the counter M is smaller than the number N (Yes in S602), the CPU 41 advances to S603. S603 to S610 are equivalent to the process of acquiring detail logs from the respective peripheral devices. First, in S603, of the information concerning the peripheral devices and held in the RAM 43 during the device monitoring process, the CPU 41 reads out the data about the peripheral device of the serial number identical to the count of the counter M. Then, the CPU 41 copies the detail log from the detail log area 23a that is a removable storage area of the peripheral device.

Next, the CPU 41 executes the detail-log time correcting process described later (S604). That is, the time data items described in the warning log and error log, both included in the detail log, are adjusted to the time axis applied in the PC 11. Then, the CPU 41 determines whether the "Device log" folder in the log folder 44e includes a sub-folder whose name is identical to the name of the peripheral device that has copied the detail log (S605). The detail log describing the time corrected is stored in the sub-folder whose name is identical to the name of the peripheral device. If such a sub-folder exists (Yes in S605), the CPU 41 advances to S607. If such a sub-folder does not exist (No in S605), the CPU 41 creates a sub-folder whose name is identical to that of the peripheral device is formed in the "Device log" folder (S606). In this case, the CPU 41 advances to S607.

In S607, the CPU 41 determines whether the sub-folder whose name is identical to the name of the peripheral device includes the "detail.log" file. Here, detail log is stored in the "Detail.log" folder. If such a "detail.log" file exists (Yes in S607), the CPU 41 merges the "detail.log" file with the content of the detail log corrected in terms of time and then stores them (S608). At this point, the identification number of the detail log, which is stored in the "detail-log" file is compared with the identification number of the detail log copied in S603. If a detail log that has the same identification number exists, this detail log is regarded as one acquired in the past, and is not merged with the "detail. log" file. As a result, this can prevent identical detail logs, if any, from being described together in the "detail.log" file. When S608 is completed, the CPU 41 advances to S610.

If a "detail.log" file is not found to exist, in S607 (No in 5607), the CPU 41 creates a "detail.log" file is formed in the sub-file whose name is identical to that of the peripheral device which has copied the detail log, and copies the content of the detail log corrected in terms of time in the "detail.log" file (S609). Then, the CPU 41 advances to S610.

In S610, the CPU 41 increments the count of the counter M by "1". The CPU 41 then returns to S602. Thus, any other peripheral device can acquire a detail log.

Next, the detail-log time correcting process executed by the CPU 41 of the PC 11 will be described with reference to FIG. 9(b). FIG. 9(b) is a flowchart showing the detail-log time correcting process. This is a process of adjusting the time data items described in the warning log and error log, both included in the detail log, to the time axis applied in the PC 11.

First, the CPU 41 determines whether the "Device log" folder in the log folder 44e includes a sub-folder whose name is identical to the name of the peripheral device that has copied the detail log (S650). If such a sub-folder exists (Yes in S650), the CPU 41 advances to S651. In S651, the CPU 41 determines whether the sub-folder whose name is identical to the name of the peripheral device includes an "easy.log" file, i.e., easy log file. Whether an easy log has been acquired from the peripheral device that has copied the detail log can thereby be determined.

If an "easy.log" file exists (Yes in S651), that is, an easy log has been acquired from the peripheral device, the CPU 41 substitutes the time data described in the detail log having the identification number same as the identification number described in the "easy.log" file by the time described in the easy log having the same identification number (S652).

If the "Device log" folder in the log folder 44e may not include a sub-folder whose name is identical to the name of the peripheral device that has copied the detail log (No in S650) and the sub-folder does not include an "easy.log" file (No in S651), the CPU 41 does not acquire easy logs have been acquired from the peripheral device. Therefore, the CPU 41 adds a marker to the detail log, showing all time data items described in the detail log are used in the peripheral device (S653). By using this marker, anyone who refers to the log can recognize that the time data items described in the detail log are those used in the peripheral device.

As described above, the easy log corresponds to the warning log and error log included in the detail log. Any logs having the same identification number have been generated at the same event in the same peripheral device. The time described in the easy log held in the "easy.log" file is one adjusted to the time axis applied in the PC 11 in the easy-log time correcting process. The time data items described in the warning log and error log included in the detail log in S652 can therefore be adjusted to the time axis applied in the PC 11. Hence, which log has been generated earlier, the warning and error logs included in the detail log or the PC log generated by the application program 44c of the PC 11 and described in the PC log file, can be determined. This helps to reduce the load of analyzing the cause of any trouble. Further, the time data items described in associated easy log and detail log can be adjusted to the same value. Which log precedes the other, the information log or the PC log, can be determined, too.

As has been described, in the log collecting system 1 according to this embodiment, detail logs are acquired at regular intervals from all peripheral devices (i.e., printer 10a, scanner 10b and facsimile 10c) in the log collecting process performed as the PC 11 executes the log collecting program 44b. Then, the detail logs concerning the operations of the peripheral devices (i.e., printer 10a, scanner 10b and facsimile 10c) and the PC logs concerning the operations the PC 11 has performed on the peripheral devices are compiled, generating a collected log file. Based on the collected log file, the user can confirm both the log generated in each peripheral device and the log generated in the PC 11. The cause of any trouble in any process performed by the PC 11 can therefore be easily identified.

The warning log and the error log influencing the operation of the peripheral device included in the detail log are acquired as easy logs at all times or at intervals during the device monitoring process performed as the PC 11 executes the device monitoring program 44a. The collected log file includes the easy logs thus acquired. Therefore, even if no detail logs have been acquired at a prescribed time, the cause of a trouble, if any, can be determined, to some extent, from the easy logs acquired at all times or at intervals and the PC log.

The data amount of the easy log acquired at all times or at intervals during the device monitoring process is smaller than the data amount of the detail log acquired at the prescribed timing during the log collecting process. As a result, this can suppress the load of communication between the PC 11 and each peripheral device. Therefore, logs for easily identifying the cause of a trouble that has developed in the process performed by the PC 11 can be collected, while suppressing the increase in the load of communication between the PC 11 and each peripheral device.

While the invention has been described in detail with reference to the embodiments thereof, it would be apparent to those skilled in the art that various changes and modifications may be made therein without departing from the spirit of the invention.

In the embodiment described above, the detail-log time correcting process is performed as illustrated in the flowchart of FIG. 9(b). Instead, the detail-log time correcting process may be performed in the same manner as the easy-log time correcting process shown in FIG. 7. In this case, the present-time data of the peripheral device may be acquired, too, from the timekeeping circuit 31 provided in the peripheral device, in order to copy the detail log from the detail log area 23a.

If the detail-log correcting process is performed in the same manner as the easy-log time correcting process shown in FIG. 7, which log has been generate earlier, the PC log in the PC 11 or the detail log, can be reliably determined. As a result, this can reduce the load of analyzing the cause of a trouble. Further, if the detail-log time correcting process is performed in the same manner as the easy-log time correcting process shown in FIG. 7, part of the detail log (e.g., warning log and error log) may be corrected in terms of the time described. Then, the process time can be reduced even if many detail logs exist.

In the embodiment described above, the easy log area 22a is provided in the RAM 22 that is a volatile memory, and the detail log area 23a is provided in the EEPROM 23 that is a nonvolatile memory. Instead, these areas may be provided in whichever memory, a volatile one or a nonvolatile one. Moreover, the nonvolatile memory may be a flash memory or a hard disk, not the EEPROM 23.

In the embodiment described above, the easy log area 22a cannot be directly accessed from the PC 11, while the detail log area 23a can be directly accessed from the PC 11. The invention is not limited to this configuration, nevertheless. The easy log area 22a may be directly accessed from the PC 11, and the detail log area 23a may not be directly accessed from the PC 11. If the easy log area 22a can be directly accessible from the PC 11, any easy log may be copied directly from the easy log area 22a. In this case, the present-time data described in the peripheral device may be acquired from the timekeeping circuit 31 incorporated in the peripheral device, at the same time the easy log is copied, in order to perform the easy-log time correcting process. The detail log area 23a may be rendered not directly accessible from the PC 11. In this case, a detail-log requesting command is transmitted to each peripheral device. On receiving the detail-log requesting command, each peripheral device transmits the detail log to the PC 11, in the same manner as in the easy-log transmitting process.

In the embodiment described above, the HDD 44 stores the log collecting program 44b. Instead, the log collecting program 44b may be stored in a compact disk, read only memory (CD-ROM) or a floppy disk (registered trademark), and may be activated from such a storage medium.

In the embodiment described above, easy logs are acquired from each peripheral device at regular intervals during the device monitoring process Instead, each peripheral device may be monitored at all times, and an easy log may be acquired at the time the easy log is generated in the peripheral device.

In the embodiment described above, a printer 10a, a scanner 10b and a facsimile device 10c are exemplified as peripheral devices. Other devices that can be connected to the PC 11, such as a camera and an external ODD, can be incorporated in a log collecting system according to this invention.

In the embodiment described above, one application program 44c collects the PC logs generated from the respective peripheral devices in the log collecting program 44b. Instead, a plurality of application programs may be executed so that the log collecting program 44b may collect the PC logs generated in the respective peripheral devices. If two or more application programs are executed to collect the PC logs, the cause of a trouble, if any, can be more easily identified than otherwise.

In this case, the application programs that the PC log files have generated for the peripheral devices, respectively, are used in each of the application programs. The PC log file for each peripheral device may describe the identification information of the application program that has generated a PC log. And, PC log files may be generated for the peripheral devices, respectively, and a sub-folder whose name can identify the associated application program may be provided in the "PC log" folder, so that the PC log file generated by the application program may be stored in the sub-folder. Furthermore, the name of the PC log file of each peripheral device, which has been generated by the associated application program, may be one that can identify the associated application program. In either case, the application program that has generated the PC log file can be identified, and the load of analyzing the cause of any trouble can therefore be reduced.

Moreover, a log about the activation, termination and setting change of each application program, and a log concerning the communication with the OS may be generated, instead of the PC log generated in the above-described embodiment, and may be stored in the "PC log" folder and collected by the log collecting program. In this case, the cause of a trouble, if any, can be more easily identified than otherwise.

In the embodiment described above, the easy log 62 and detail log 61 generated for each peripheral device are stored in the sub-folder provided in the "Device log" folder and associated with each peripheral device. Instead, an easy log file and a detail log file are provided in the "Device log" folder, and the name of each of these log files may contain information that can identify the associated peripheral device. Alternatively, an easy log file and a detail log file that store the easy logs 62 and detail logs 61 generated in all peripheral devices, respectively, may be provided in the "Device log" folder, and may store the easy logs 62 and detail logs 61, respectively, together with the identification information about the peripheral devices that have generated the logs. In either case, the peripheral device that has generated an easy log 62 and a detail log 61 can be easily identified.

In the embodiment described above, the identification number 61b is described in both the easy log 62 and the detail log 61. Instead, the time data 61a may serve as identification number. In this case, the time data 61a is described in so minute units as milliseconds, and the time data 61a described in one log should not overlap the time data described in any other log.

What is claimed is:

1. A log collecting system comprising:
   a computer apparatus; and
   at least one peripheral apparatus connected to the computer apparatus, the computer apparatus collecting a log that records operation of the at least one peripheral apparatus,
   the peripheral apparatus comprising:
   a first log memory controlling section that stores a first log relating to all operation of the at least one peripheral apparatus in a first log memory region; and
   a second log memory controlling section that stores, in a second log memory region, a second log indicative of any influence on the operation of the at least one peripheral apparatus among the first logs,
   the computer apparatus comprising:
   a third log memory controlling section that stores, in a third log memory region, a third log relating to the operation of the computer apparatus concerning the at least one peripheral apparatus;
   a fourth log memory controlling section that continuously or discontinuously acquires the second logs stored in the second log memory region, and stores the second log in a fourth log memory region;
   a first log acquiring section that acquires, at a predetermined timing, the first log stored in the first log memory region; and
   a log information creating section that creates one log information with the acquired first log, the third log stored in the third log memory region, and the second log stored in the fourth log memory region when the first log acquiring section acquires the first log.

2. The log collecting system according to claim 1, wherein the peripheral apparatus further comprises a first timekeeping section that counts a first time used in the peripheral apparatus, and
   wherein the computer apparatus further comprises;
   a second timekeeping section that counts a second time used in the computer apparatus;
   a peripheral apparatus time acquiring section that acquires the first time; and
   a time interval calculating section that calculates a time interval between the first time and the second time,
   wherein the second log memory controlling section stores the first time to be involved in the second Log in the second log memory region when storing the second log in the second log memory region;
   wherein the third log memory controlling section stores the second time to be involved in the third log in the third log memory region when storing the third log in the third log memory region;
   wherein the fourth log memory controlling section corrects the first time involved in the second log according to the time interval calculated by the time interval calculating section, and stores the corrected time to be involved in the second log in the fourth log memory region.

3. The log collecting system according to claim 2, wherein the first log memory controlling section stores an identification data to be involved in the first log in the first log memory region, the identification data identifying each first log;

wherein the second log memory controlling section stores the second log and the identification data in the second log memory region, and wherein the first log acquiring section includes in the first log the corrected time included in the second log if after acquiring the first log stored in the first log memory region the acquired identification data included in the first log is identical with one of the identification data included in the second log, stored in the fourth log memory region.

4. The log collecting system according to claim 2, wherein the first log acquiring section acquires the first log stored in the first log memory region from the peripheral apparatus, and the log information creating section creates one log information when the computer apparatus detects an instruction from an external source.

5. The log collecting system according to claim 1, wherein the peripheral apparatus further comprises a first timekeeping section that counts a first time used in the peripheral apparatus, and wherein the computer apparatus further comprises;

a second timekeeping section that counts a second time used in the computer apparatus;

a peripheral apparatus time acquiring section that acquires the first time; and a time interval calculating section that calculates a time interval between the first time and the second time, wherein the first log memory controlling section stores a first time to be involved in the first log in the first log memory region when storing the first log in the first log memory region;

wherein the third log memory controlling section stores the second time to be involved in the third log in the third log memory region when storing the third log in the third log memory region;

wherein the first log acquiring section corrects the first time involved in the first log according to a time interval calculated by the time interval calculating section after acquiring the first log stored in the first log memory region.

6. The log collecting system according to claim 1, wherein a plurality of peripheral apparatuses are connected to the computer;

wherein the fourth log memory region has sub-regions each provided with each peripheral apparatus;

wherein the fourth log memory controlling section stores the second log acquired from one of the peripheral apparatus, in each of the subregions;

wherein the first log acquiring section stores the first log each acquired from one of the peripheral apparatus, in each of the sub-regions;

wherein the log information creating section creates the log information in which the first log and the second log stored in each of the sub-regions are associated with the name of the respective peripheral apparatus.

7. The log collecting system according to claim 1, wherein the first log memory region is provided at a nonvolatile storing section in which data is retained even if the peripheral apparatus is powered off.

8. A computer apparatus connected to at least one of the peripheral apparatus and collecting the log of the operation of the peripheral apparatus including a first log memory region that stores a first log relating to a record of operation of the peripheral apparatus, and a second log memory region that stores, among the first log, a second log indicative of influence on the operation of the peripheral apparatus, the computer apparatus comprising:

a third log memory controlling section that stores, in a third log memory region, a third log relating to the operation of the computer apparatus concerning the at least one peripheral apparatus;

a fourth log memory controlling section that continuously or discontinuously acquires the second logs stored in the second log memory region, and stores the second log in a fourth log memory region;

a first log acquiring section that acquires, at a predetermined timing, the first log stored in the first log memory region; and a log information creating section that creates one log information with the acquired first log, the third log stored in the third log memory region, and the second log stored in the fourth log memory region when the first log acquiring section acquires the first log.

9. A computer readable storage medium storing a set of log collecting program instructions executable on a computer apparatus connected to at least one of the peripheral apparatus and collecting the log of the operation of the peripheral apparatus including a first log memory region that stores a first log relating to a record of operation of the peripheral apparatus, and a second log memory region that stores, among the first log, a second log indicative of influence on the operation of the peripheral apparatus, the instructions comprising:

storing, in a third log memory region, a third log relating to the operation of the computer apparatus concerning the at least one peripheral apparatus;

acquiring continuously or discontinuously the second logs stored in the second log memory region, and stores the second log in a fourth log memory region;

acquiring, at a predetermined timing, the first log stored in the first log memory region; and creating one log information with the acquired first log, the third log stored in the third log memory region, and the second log stored in the fourth log memory region when the first log acquiring section acquires the first log.

10. The computer readable storage medium according to claim 9, wherein the set of log collecting program instructions further comprises instructions for counting a first time used in the peripheral apparatus, for counting a second time used in the computer apparatus, for acquiring the first time, for calculating a time interval between the first time and the second time, for storing the first time to be involved in the second log in the second log memory region when storing the second log in the second log memory region, for storing the second time to be involved in the third log in the third log memory region when storing the third log in the third log memory region, correcting the first time involved in the second log according to the time interval calculated by the time interval calculating section, and storing the corrected time to be involved in the second log in the fourth log memory region.

11. The computer readable storage medium according to claim 9, wherein the set of log collecting program instructions further comprises instructions for counting a first time used in the peripheral apparatus, for counting a second time used in the computer apparatus, for acquiring the first time, for calculating a time interval between the first time and the second time, for storing the first time to be involved in the first log in the first log memory region when storing the first log in the first log memory region, for storing the second time to be involved in the third log in the third log memory region when storing the third log in the third log memory region, correcting the first time involved in the first log according to a time interval calculated by the time interval calculating section after acquiring the first log stored in the first log memory region.

12. The computer readable storage medium according to claim 9, wherein the set of log collecting program instructions further comprises instructions for storing an identification data to be involved in the first log in the first log memory region, the identification data identifying each first log, for storing the second log and the identification data in the second log memory region and for including in the first log the corrected time included in the second log if after acquiring the first log stored in the first log memory region the acquired identification data included in the first log is identical with one of the identification data included in the second log, stored in the fourth log memory region.

13. The computer readable storage medium according to claim 9, wherein the set of log collecting program instructions further comprises instructions for storing the second log acquired from one of the peripheral apparatus, in each of the sub-regions, for storing the first log each acquired from one of the peripheral apparatus, in each of the sub-regions and for creating the log information in which the first log and the second log stored in each of the sub-regions are associated with the name of the respective peripheral apparatus.

14. The computer readable storage medium according to claim 9, wherein the set of log collecting program instructions further comprises instructions for acquiring the first log stored in the first log memory region from the peripheral apparatus and creating one log information when the computer apparatus detects an instruction from an external source.

* * * * *